United States Patent
Kan et al.

(10) Patent No.: US 7,343,478 B2
(45) Date of Patent: Mar. 11, 2008

(54) REGISTER WINDOW SYSTEM AND METHOD THAT STORES THE NEXT REGISTER WINDOW IN A TEMPORARY BUFFER

(75) Inventors: Ryuji Kan, Kawasaki (JP); Hideo Yamashita, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 11/333,229

(22) Filed: Jan. 18, 2006

(65) Prior Publication Data

US 2007/0067612 A1 Mar. 22, 2007

(30) Foreign Application Priority Data

Sep. 22, 2005 (JP) ............................. 2005-275024

(51) Int. Cl.
*G06F 9/44* (2006.01)
(52) U.S. Cl. .................... 712/220; 712/228
(58) Field of Classification Search ............... 712/220, 712/228
See application file for complete search history.

(56) References Cited

U.S. PATENT DOCUMENTS

| 5,083,263 | A | | 1/1992 | Joy et al. | |
|---|---|---|---|---|---|
| 5,159,680 | A | | 10/1992 | Joy et al. | |
| 5,179,682 | A | * | 1/1993 | Jensen ........................ | 711/118 |
| 6,263,416 | B1 | * | 7/2001 | Cherabuddi .................. | 712/23 |
| 6,314,510 | B1 | * | 11/2001 | Saulsbury et al. .......... | 712/213 |
| 6,704,858 | B1 | * | 3/2004 | Sugimoto .................... | 712/228 |
| 7,080,237 | B2 | * | 7/2006 | Thimmannagari et al. .. | 712/220 |
| 7,216,216 | B1 | * | 5/2007 | Olson et al. ................. | 712/220 |
| 2003/0126415 | A1 | * | 7/2003 | Okawa et al. ............... | 712/228 |

FOREIGN PATENT DOCUMENTS

| JP | 9-6630 | 1/1997 |
|---|---|---|
| JP | 2003-196086 | 7/2003 |
| KR | 1999-026795 | 4/1999 |

OTHER PUBLICATIONS

U.S. Appl. No. 10/102,827, filed Mar. 22, 2002, Yasukichi Okawa, et al., Fujitsu Limited.
Notice of Allowance dated Sep. 5, 2007 issued by the Korean Intellectual Property Office for Korean Application No. 10-2006-0017688.

* cited by examiner

*Primary Examiner*—Richard L. Ellis
*Assistant Examiner*—Jacob Petranek
(74) *Attorney, Agent, or Firm*—Staas & Halsey LLP (57) ABSTRACT

The present apparatus reduces hardware resources and improves data read throughput in an information processing apparatus employing the out-of-order instruction execution method. The apparatus includes: an arithmetic operation unit which executes a window switching instruction and an instruction relating to data stored in the current register or data held in the replacing buffer; and a control unit which transfers, if a window switching instruction is decoded at execution of the window switching instruction by the arithmetic operation unit, data of the register window which is to be specified by the current window pointer upon completion of execution of the window switching instruction, to the replacing buffer.

20 Claims, 9 Drawing Sheets

PRIOR ART

FIG. 6

PRIOR ART

FIG. 7

PRIOR ART

FIG. 8

PRIOR ART

FIG. 9

PRIOR ART

REGISTER WINDOW SYSTEM AND METHOD THAT STORES THE NEXT REGISTER WINDOW IN A TEMPORARY BUFFER

BACKGROUND OF THE INVENTION

1. Field of the Invention

The present invention relates to an art for making it possible to change the order in which instructions are executed in an information processing apparatus with architecture having register windows, which information processing apparatus employs the out-of-order instruction execution method. The changing in the order of instruction execution is performed, irrespectively of register window switching.

2. Description of the Related Art

Some of previous information processing apparatuses (RISC: Reduced Instruction Set Computer) employing architecture of a reduced instruction set type, have more than one register set (hereinafter called "register window"), thereby making it unnecessary to save/return registers, caused at the time of calling/returning of a subroutine, on a memory stack.

Register windows are linked in a ring-like form, and their management is performed using register window numbers (hereinafter called "window numbers"). For example, eight register windows with window numbers 0 through 7 are provided, and they are used in the order of 0, 1, 2, . . . , 7. The number of a window in use is held in a register [hereinafter called "CWP" (Current Window Pointer)] for holding a window number.

Figure 5:
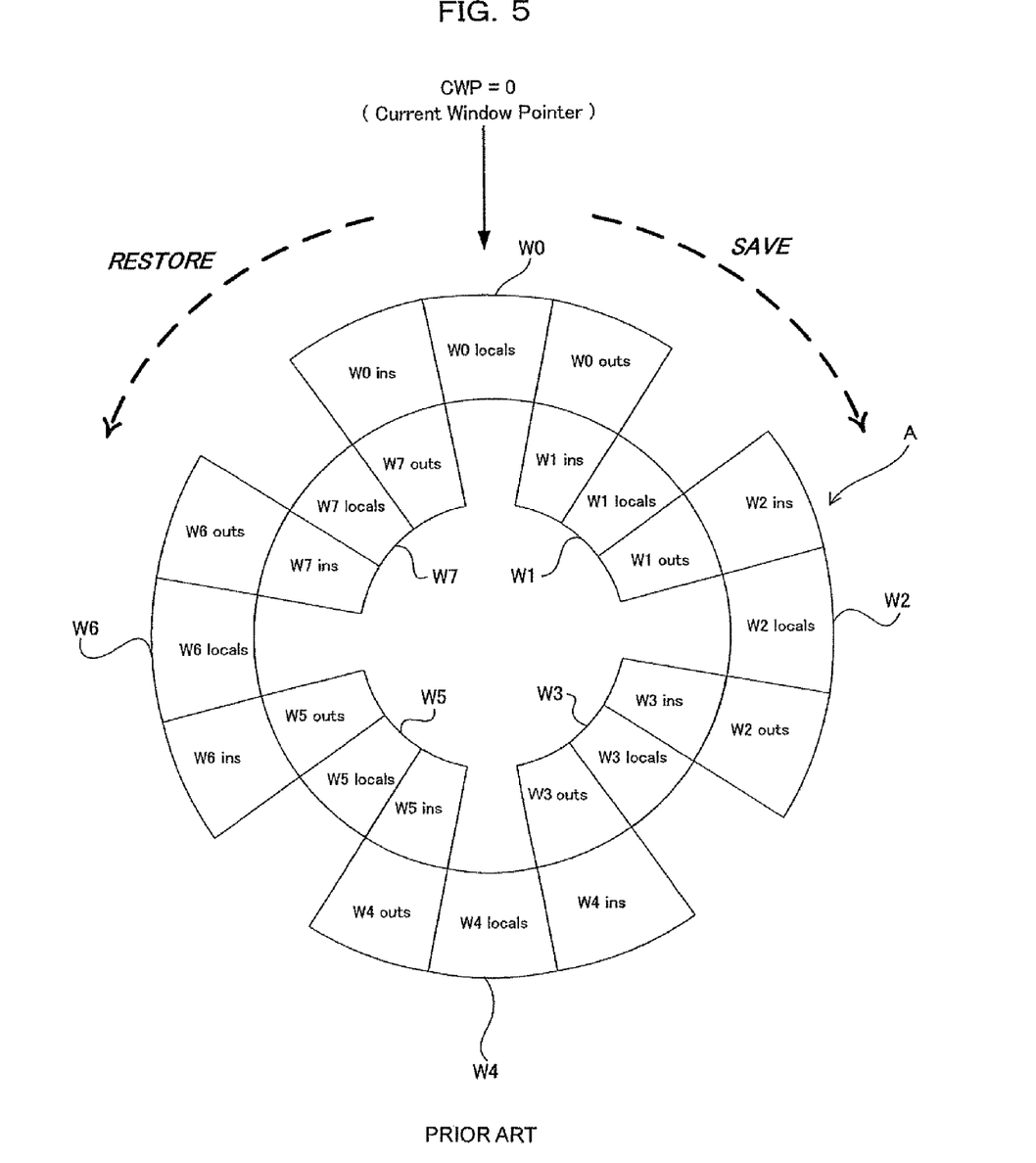
FIG. 5 is a diagram showing a previous ring-like register file (register windows) formed in a master register file of the information processing apparatus according to the present embodiment.

FIG. 5 is a diagram showing a construction of a ring-like register file A. In this register file A, register windows W0 through W7 are linked in a ring-like form with overlap there among. Each of the register windows W0 through W7 is formed by, for example, 32×64-bit registers. Of the 32 registers, eight registers (Global registers; not illustrated) are common to all the register windows W0 through W7. The 24 remaining registers are divided into three areas ("ins", "locals", and "outs" in the drawing) each including eight registers.

That is, taking the register window W0 as an example, eight registers W0ins of the left end overlap with the registers W7outs of the previous register window W7 and are common therebetween (that is, the registers W0ins also functions as the registers W7outs). Further, the eight middle registers W0locals do not overlap with any registers, and hold data of their own. Eight registers W0outs of the right end and the registers W1ins of the subsequent register window W1 are common to each other. In this instance, as in the case of the register window W0, in the register windows W1 through W7, eight registers of the ins register window and eight registers of the previous outs register window are common to each other; the eight middle registers do not overlap with any registers and hold data of their own; eight registers of the outs register window and eight registers of the subsequent ins register window overlap each other and are common to each other.

Such a register file A of FIG. 5 is called overlap register window.

In this register file A, register window switching instructions (hereinafter also simply called "switching instruction"), which are for switching the current register window W0 through W7 specified by the CWP, include a SAVE instruction which is for incrementing the CWP and a RESTORE instruction (RETURN instruction) which is for decrementing the CWP. Hereinafter, the register window switching instruction is called "SAVE instruction" and "RESTORE instruction". Here, note that the CWP in FIG. 5 specifies the register window W0.

The register file A is an example in which the number of windows n=8 (register windows W0 through W7). The register file A has a total of 136 registers: 8 (registers)×8 (windows)=64 (registers) for the local area; 8 (registers)×8 (windows)=64 (registers) for the in/out overlap area; 8 registers for global registers (not illustrated). It is necessary to be able to read/write from/to all the 136 registers.

Figure 6:
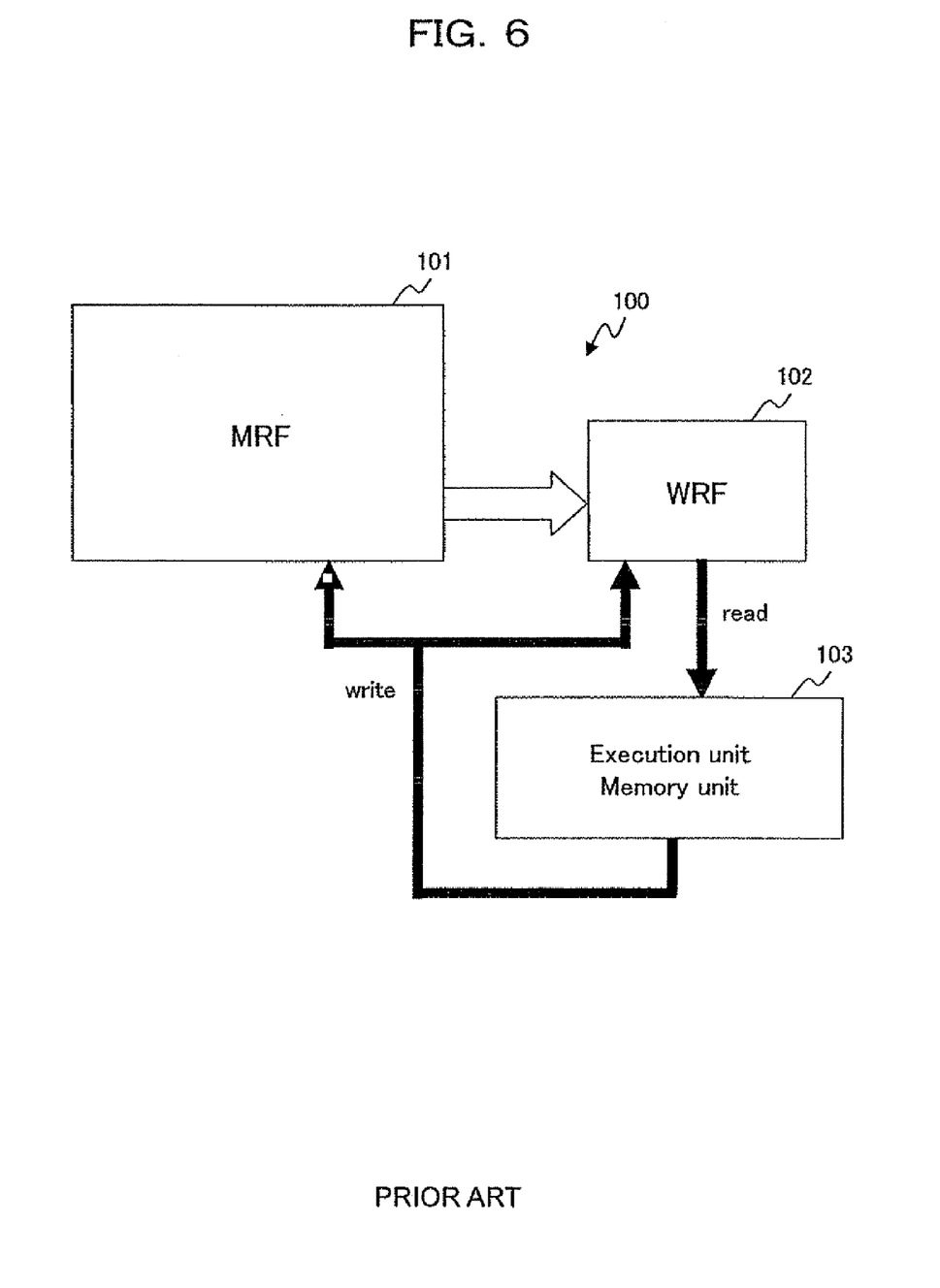
FIG. 6 is a block diagram showing a construction of a previous information processing apparatus.

The speed and the size of the circuitry which reads data from such a large register file A have been issues to be solved, and thus, there has been developed an information processing apparatus 100 of FIG. 6. The information processing apparatus 100 includes: a Master Register File (MRF) 101; a Working Register File (WRF) 102; and an arithmetic operation unit 103, which has an execution unit (designated as "Execution unit" in the drawing) and a memory unit (designated as "Memory unit" in the drawing).

Generally speaking, a register window with a large number of windows needs a considerably large register file (eight windows need 136 registers), and thus it becomes difficult to supply operands to an arithmetic operation unit in high speed.

Therefore, as shown in FIG. 6, in addition to the MRF 101 which holds all the windows, a WRF 102, as a subset for holding a copy of data of the current register window specified by the CWP in the MRF 101, is provided. This WRF 102 supplies operands to the arithmetic operation unit 103. Since the WRF 102 only holds the window which is specified by the CWP, its capacity is 32 entries, which is smaller than that of the MRF 101. As a result, it is possible to enhance the speed of reading by the arithmetic operation unit 103.

However, in such a construction as of the information processing apparatus 100, the WRF 102 holds registers for a single register window, or the current register window specified by the CWP. In consequence, when an SAVE instruction or a RESTORE instruction is executed, it becomes impossible to supply operands necessary in the subsequent instruction from the WRF 102, which is a new problem.

As a result, when a SAVE instruction or a RESTORE instruction is executed, the WRF 102 must be replaced with the value of a new window. Thus, window (data) transfer processing from the MRF 101 to the WRF 102 is caused, and execution of instructions thereafter is stalled.

Further, in an information processing apparatus in which the order in which instructions are executed is changed under out-of-order instruction execution, instructions are executed beginning from executable instructions, irrespective of their order in the program. However, instructions which are to be executed subsequently to a SAVE instruction or a RESTORE instruction cannot be executed until the window after being subjected to the SAVE/RESTORE operations is transferred to the WRF 102, even if such instructions become executable.

Such limitation will considerably deteriorate the performance of information processing apparatuses which employ the out-of-order instruction execution method, in which apparatuses the number of instructions concurrently issued is large. In such information processing apparatuses employing the out-of-order instruction execution method, a great number of instructions are fetched and then accumulated in a buffer. Executable instructions are executed from the buffer in the order irrespective of the order in the program, whereby the throughput of instruction execution is improved.

Accordingly, the above-mentioned limitation that the order of execution of instruction cannot be changed when SAVE instructions and RESTORE instructions appear will cause a phenomenon that every when a SAVE instruction or a RESTORE instruction appears the out-of-order processing mechanism does not function, thereby causing significant deterioration in the performance.

Figure 7:
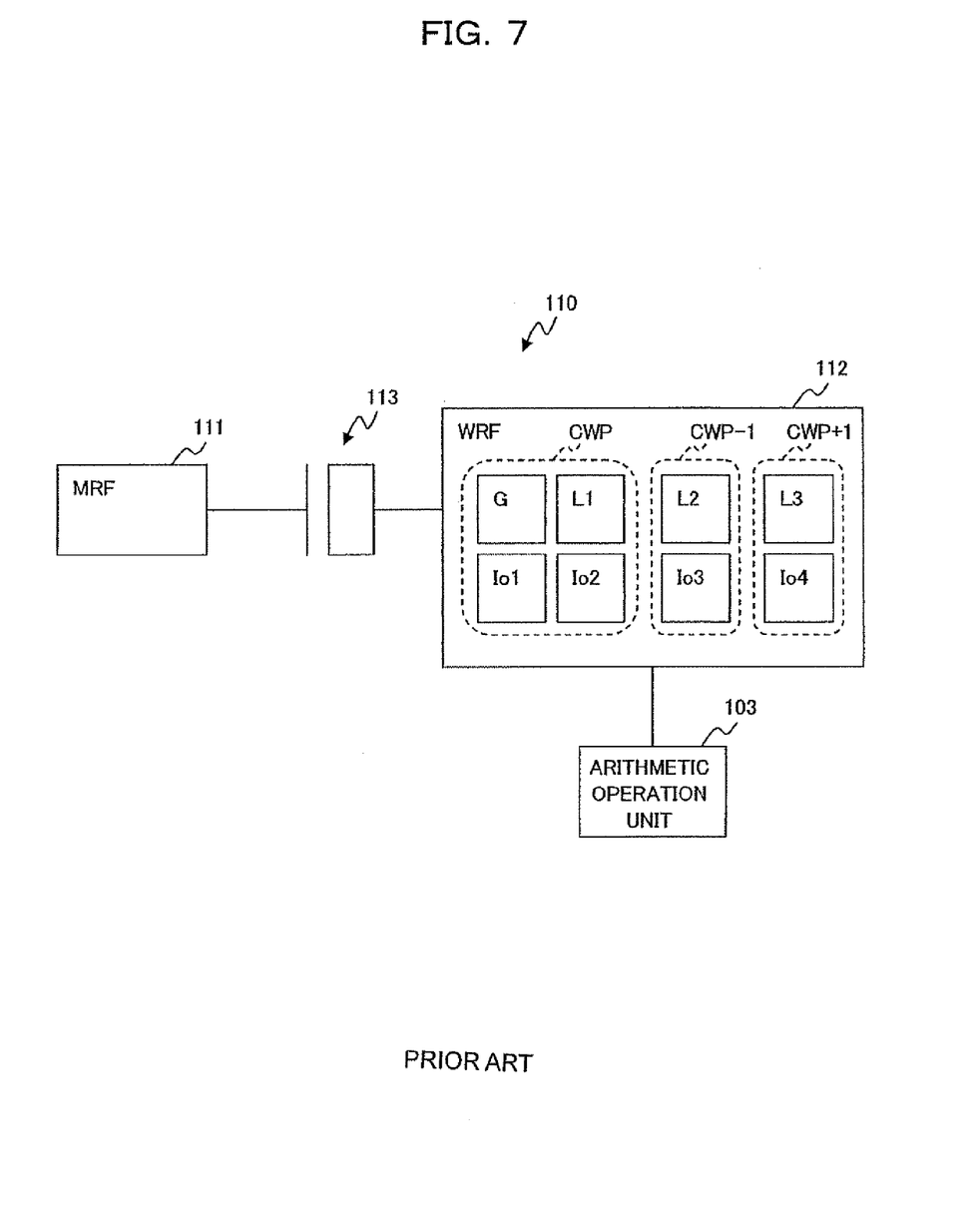
FIG. 7 is a block diagram showing a construction of a previous information processing apparatus.

In view of this disadvantage, as shown in FIG. 7, there has been developed an information processing apparatus 110 (for example, see the following patent document 1) in which the WRF 112 stores, in addition to data (G, L1, Io1, and Io2) of the current register window which is specified by the CWP, data (L2, Io3, L3, and Io4) of the register windows preceding and following the current register window (that is, registers of the register windows indicated by CWP+1 and CWP−1 are transferred beforehand). In this information processing apparatus, out-of-order execution is available with respect to instructions preceding and following SAVE instructions and RESTORE instructions.

In the above information processing apparatus 110, registers (here, 8 registers×8 byte) 113 for latching data therein are interposed between the MRF 111 and the WRF 112 when data is transferred from the MRF 111 to the WRF 112.

Figure 8:
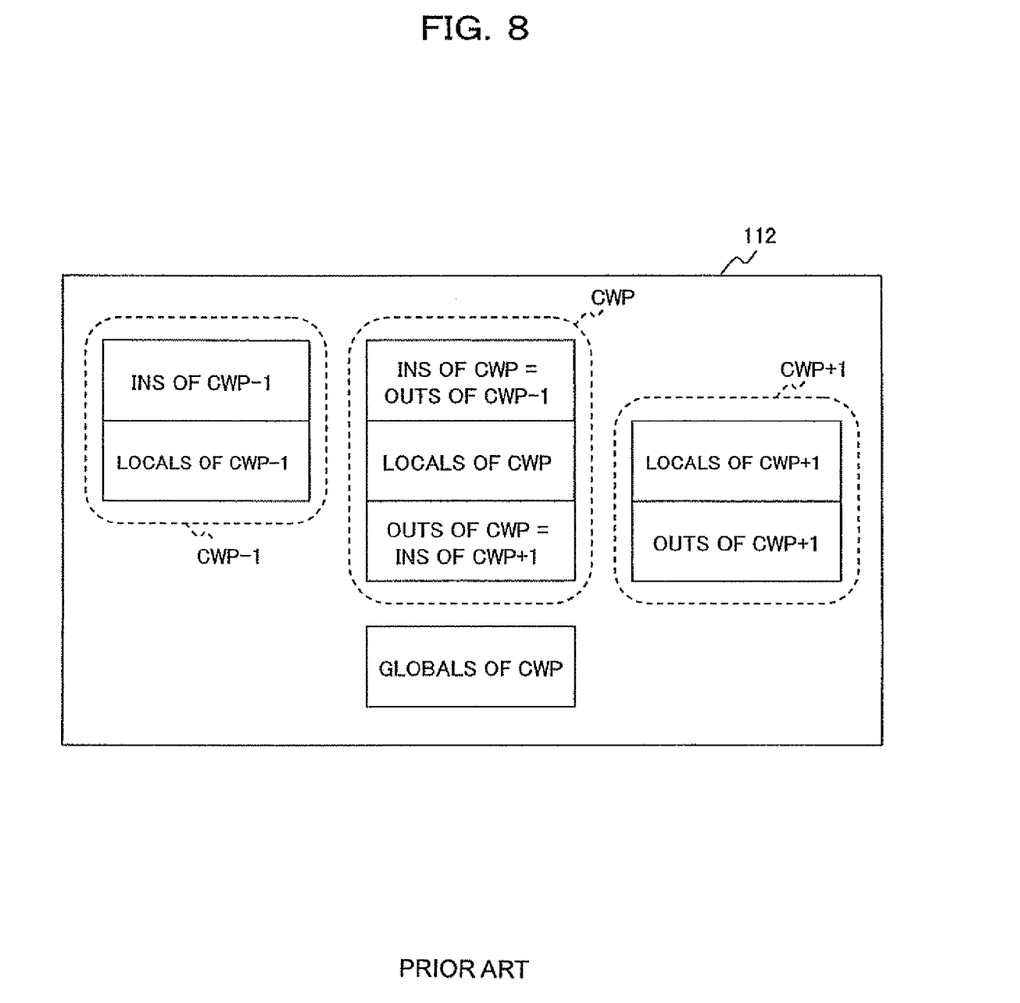
FIG. 8 is a diagram for describing data held in a register file of the previous information processing apparatus of FIG. 7.

As shown in FIG. 8, the WRF 112 stores the contents of Ins of CWP (the same as Outs of CWP−1), Locals of CWP, Outs of CWP (the same as Ins of CWP+1), which are the registers of the current register window [here, the register window currently specified by the CWP is described as "CWP", and the register window (the register window after incrementing the current CWP) following the CWP is described as "CWP+1", and the register window (the register window after decrementing the current CWP) preceding the current CWP is described as "CWP−1". In the following description, the register windows W0 through W7 are sometimes described as "CWP", "CWP+1", and "CWP−1" based on the relationship with the above CWP] specified by the CWP, and also stores Ins of CWP−1 and Locals of CWP−1, which are registers of a register window needed by the instruction after execution of a RESTORE instruction, and Outs of CWP+1 and Locals of CWP+1, which are registers of a register window needed by the instruction after execution of a SAVE instruction.

Figure 9:
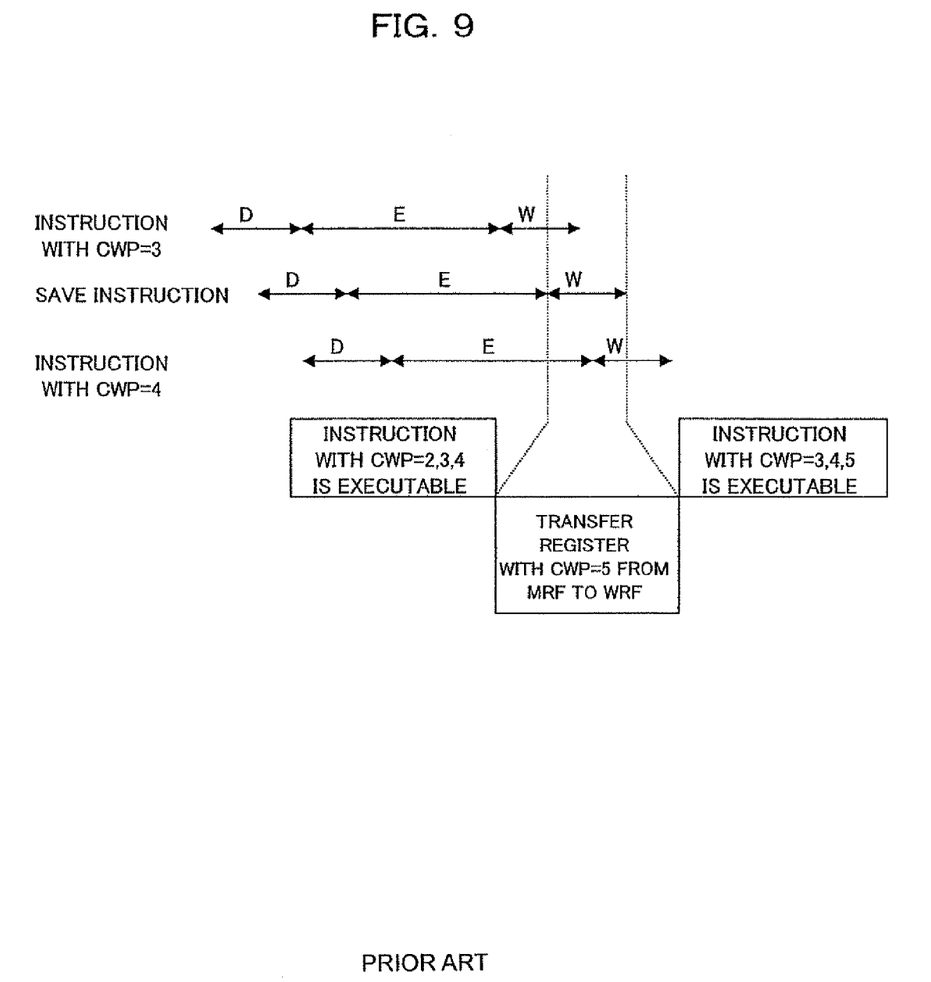
FIG. 9 is a diagram showing an example of operation of an arithmetic operation unit of the previous information processing apparatus of FIG. 7.

In consequence, as shown in FIG. 9, according to the information processing apparatus 110, When the CWP indicates the register window W3, The WRF 112 holds data of the register window W2 through W4 until the SAVE instruction is executed (see the double headed arrow line "E" in the drawing). Thus, the arithmetic operation unit 103 is capable of executing the instructions of the register windows W2 through W4. Here, in FIG. 9, the double headed arrow line "D" designates instruction decoding (Fetch, Issue cycle); the double headed arrow line "E" designates instruction execution (Dispatch, Execute, Update Buffer cycle); the double headed arrow line "W" designates completion of execution of an instruction (Write back; Commit cycle).

After completion of the SAVE instruction, the CWP specifies the register window W4, the information processing apparatus 110 transfers data of the register window W5 from MRF 111 to WRF 112 via the register 113. As a result, the WRF 112 stores data of the register window W3 through W5, and the arithmetic operation unit 103 resultantly executes instructions of the register windows W3 through W5.

In this instance, in the information processing apparatus 110, the arithmetic operation unit 103 is capable of executing an instruction of the register window W4 prior to the SAVE instruction, and is also capable of executing an instruction of the register window W2 prior to the RESTORE instruction.

However, in the previous information processing apparatus 110, since the WRF 112 holds data of three register windows, a total of 72 registers are necessary: eight registers 113 for latching and 64 registers for WRF 112. Thus, in comparison with the WRF 102 in the information apparatus 100 of FIG. 6, 40 registers must be added, thereby increasing hardware resources.

Accordingly, the area (circuitry area) for a selection circuit for reading out data to the WRF 112 and arithmetic operation unit 103 becomes large, and also, data read throughput from the WRF 112 by arithmetic operation unit 103 is delayed.

[Patent Document 1] Japanese Patent Application Laid-open No. HEI 2003-196086

SUMMARY OF THE INVENTION

With the foregoing problems in view, it is an object of the present invention to reduce hardware resources and to improve data read throughput in an information processing apparatus which employs register windows and the out-of-order execution method.

In order to accomplish the above object, according to the present invention, there is provided an arithmetic processor, comprising: at least one register file having a plurality of register windows each formed by a set of registers including an in-register, a local register, and an out-register, in this order, the plurality of register windows being arranged in a ring-like form; a current window pointer which indicates the position of a current register window by using a pointer value when access is performed to the register windows; a current register which reads data, stored in a register window that is specified by the pointer value indicated by the current window pointer, from the register file; a replacing buffer interposed between the register file and the current register, the replacing buffer holding data which is to be sent from the register file to the current register; an arithmetic operation unit which executes (i) a window switching instruction for switching the register windows and (ii) an instruction relating to data stored in the current register or data held in the replacing buffer; and a control unit which transfers, if a window switching instruction is decoded at execution of the window switching instruction by the arithmetic operation unit, data of the register window which is to be specified by the current window pointer upon completion of execution of the window switching instruction, to the replacing buffer.

As a preferred feature, after completion of execution of the window switching instruction by the arithmetic operation unit, the control unit replaces data store in the current register with data held in the replacing buffer, thereby storing data in the next resister window, into which the current register window is switched under the window switching instruction, in the current register.

As yet another preferred feature, the arithmetic operation unit writes resultant data, resultantly obtained after execution of the instruction, to the register file and the current register.

As a further preferred feature, the arithmetic operation unit concurrently writes resultant data, resultantly obtained after execution of the instruction, to the register file and the current register.

As a still preferred further feature, in the register file, the in-register of one of two adjacent register windows and the out-register of the other of the two adjacent register windows are provided as one common register.

As another preferred feature, if the arithmetic operation unit decodes the window switching instruction, the control unit transfers, to the replacing buffer, data stored in the local register of the register window which is specified by the pointer value and data stored in either one of the in-register and the out-register of the register window which is specified by the pointer value.

As yet another preferred feature, if the arithmetic operation unit completes execution of the window switching instruction, the control unit transfers, from the replacing buffer to the current register, data stored in the local register of the register window which is specified by the pointer value and data stored in either one of the in-register and the out-register of the register window which is specified by the pointer value.

As a generic feature, there is provided an arithmetic processor, comprising: a plurality of register files which have multiple register windows each including plural windows, the plural windows being arranged in a ring-like form; a current window pointer which indicates the position of a current window by using a pointer value when access is performed to the register windows; a current register which reads data, stored in the current window that is specified by the pointer value indicated by the current window pointer, from the register file; a replacing buffer interposed between the register file and the current register, the replacing buffer holding data of the window which is to be sent from the register file to the current register; an arithmetic operation unit which executes (i) a window switching instruction for switching the windows and (ii) an instruction relating to data stored in the current register or data held in the replacing buffer; and a control unit which transfers, if a window switching instruction is decoded at execution of the window switching instruction by the arithmetic operation unit, data in a register window which is to be specified by the current window pointer upon completion of execution of the window switching instruction, to the replacing buffer, the control unit transferring, if at execution, by unit of the arithmetic operation unit, of a load pointer instruction for updating a pointer value held by the current window pointer, the pointer value is updated, data of one register window which is specified by the updated pointer value, from the register file to the current register via the replacing buffer.

As a preferred feature, a window of the register file is formed by (i) a set of registers: an in-register; a local register; and an out-register, and (ii) a set of global registers which is shared among the register windows, and data of the one register window, which data is to be transferred from the register file to the replacing buffer or from the replacing buffer to the current register, is transferred in the following order named: data relating to the global register, data relating to the out-register, data relating to the in-register, and data relating to the local register.

As another generic feature, there is provided an information processing apparatus, comprising: at least one register file having a plurality of register windows each formed by a set of registers including an in-register, a local register, and an out-register, in this order, the plurality of register windows being arranged in a ring-like form; a current window pointer which indicates the position of a current window by using a pointer value when access is performed to the register windows; a current register which reads data, stored in a register window that is specified by the pointer value indicated by the current window pointer, from the register file; a replacing buffer interposed between the register file and the current register, the replacing buffer holding data which is to be sent from the register file to the current register; an arithmetic operation unit which executes (i) a window switching instruction for switching the register windows and (ii) an instruction relating to data stored in the current register or data held in the replacing buffer; and a control unit which transfers, if a window switching instruction is decoded at execution of the window switching instruction by the arithmetic operation unit, data in a register window which is to be specified by the current window pointer upon completion of execution of the window switching instruction, to the replacing buffer.

As a preferred feature, after completion of execution of the window switching instruction by the arithmetic operation unit, the control unit replaces data stored in the current register with data held in the replacing buffer, thereby storing data in the next resister window, into which the current register window is switched under the window switching instruction, in the current register.

As another preferred feature, the arithmetic operation unit writes resultant data, resultantly obtained after execution of the instruction, to the register file and the current register.

As yet another preferred feature, the arithmetic operation unit concurrently writes resultant data, resultantly obtained after execution of the instruction, to the register file and the current register.

As a further preferred feature, in the register file, the in-register of one of two adjacent register windows and the out-register of the other of the two adjacent register windows are provided as one common register.

As a still further preferred feature, if the arithmetic operation unit decodes the window switching instruction, the control unit transfers, to the replacing buffer, data stored in the local register of the register window which is specified by the pointer value and data stored in either one of the in-register and the out-register of the register window which is specified by the pointer value.

As another preferred feature, if the arithmetic operation unit completes execution of the window switching instruction, the control unit transfers, from the replacing buffer to the current register, data stored in the local register of the register window which is specified by the pointer value and data stored in either one of the in-register and the out-register of the register window which is specified by the pointer value.

As a generic feature, there is provided an information processing apparatus, comprising: a plurality of register files which have multiple register windows each including plural windows, the plural windows being arranged in a ring-like form; a current window pointer which indicates the position of a current window by using a pointer value when access is performed to the register windows; a current register which reads data, stored in the current window that is specified by the pointer value indicated by the current window pointer, from the register file; a replacing buffer interposed between the register file and the current register, the replacing buffer holding data of the window which is to be sent from the register file to the current register; an arithmetic operation unit which executes (i) a window switching instruction for switching the windows and (ii) an instruction relating to data stored in the current register or data held in the replacing buffer; and a control unit which transfers, if a window switching instruction is decoded at execution of the window switching instruction by the arithmetic operation unit, data in a register window which is to be specified by the current window pointer upon completion of execution of the window switching instruction, to the replacing buffer, the control unit transferring, if at execution, by unit of the arithmetic operation unit, of a load pointer instruction for updating a pointer value held by the current window pointer, the pointer value is updated, data of one register window which is specified by the updated pointer value, from the register file to the current register via the replacing buffer.

As a preferred feature, a window of the register file is formed by (i) a set of registers: an in-register; a local register; and an out-register, and (ii) a set of global registers which are shared among the register windows, and data of the one register window, which data is to be transferred from the register file to the replacing buffer or from the replacing buffer to the current register, is transferred in the following order named: data relating to the global register, data relating to the out-register, data relating to the in-register, and data relating to the local register.

As another generic feature, there is provided a register file control method for an arithmetic processor including: a register file having a plurality of register windows arranged in a ring-like form, each the register window being formed by a set of registers; a current window pointer which indicates the position of a current register window by using a pointer value; a current register which reads data, stored in a register window that is specified by the pointer value indicated by the current window pointer, from the register file; a replacing buffer for holding data which is to be sent from the register file to the current register; and an arithmetic operation unit which executes (i) a window switching instruction for switching the register windows and (ii) an instruction relating to data stored in the current register or data held in the replacing buffer, the method comprising: transferring, if a window switching instruction is decoded at execution of the window switching instruction by the arithmetic operation unit, data in a register window which is to be specified by the current window pointer upon completion of execution of the window switching instruction, to the replacing buffer.

As a preferred feature, the register file control method further comprises: replacing, after completion of execution of the window switching instruction by the arithmetic operation unit, data store in the current register with data held in the replacing buffer, thereby storing data in the next resister window, into which the current register window is switched under the window switching instruction, in the current register.

As described so far, according to the present invention, the arithmetic operation unit is connected in such a manner that it can read data from the current register and the replacing buffer. When the arithmetic operation unit decodes a window switching instruction such as a SAVE instruction and a RESTORE instruction, the control unit performs control such that data of a register window, which is next to be held in the current register after execution of the switching instruction, is read from a master register, and is then stored in the replacing buffer. Inconsequence, it becomes possible for the arithmetic operation unit to read data, which is next to be held in the current register after execution of the window switching instruction, from the replacing buffer before actual execution of the window switching instruction, thereby reliably executing an instruction which uses data of the above mentioned register window.

Therefore, differing from the previous apparatus, it is no longer necessary to pre-read the preceding and the following register windows of the current register window, a total of three registers windows, and instructions are executable in the out-of-order method. Thus, the capacity (hardware resource) of a register which is required to execute an instruction following a window switching instruction before actual execution of the window switching instruction, is reduced.

In consequence, throughput at data reading from the current register and the replacing buffer for instruction execution by the arithmetic operation unit is improved.

In addition, since hardware resources are reduced, an implement area for registers is reduced, and power consumption is also reduced.

Other objects and further features of the present invention will be apparent from the following detailed description when read in conjunction with the accompanying drawings.

BRIEF DESCRIPTION OF THE DRAWINGS

FIG. 4(a) through FIG. 4(c) are diagrams for describing data held in a current window register and a current window replace buffer of the information processing apparatus according to the present embodiment.

DESCRIPTION OF THE PREFERRED
EMBODIMENT(S)

Referring to the relevant drawings, one preferred embodiment of the present invention will now be described.

[1] One Preferred Embodiment

Figure 1:
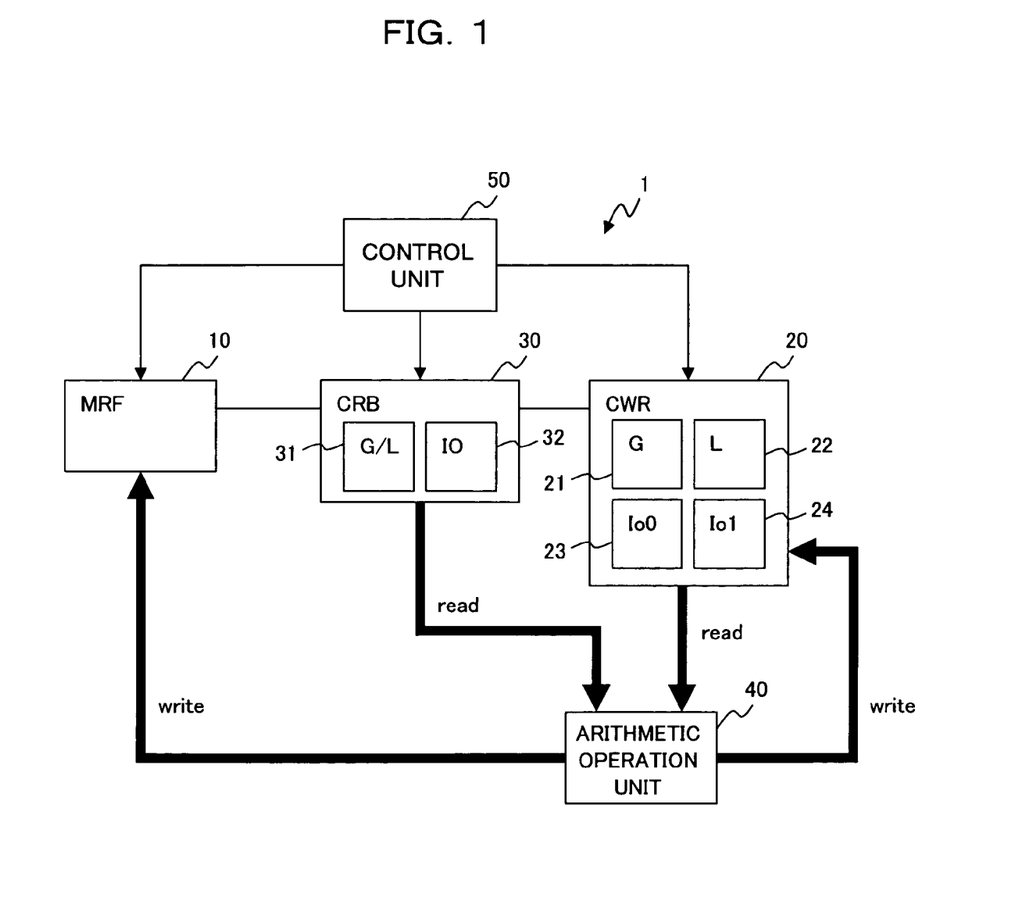
FIG. 1 is a block diagram showing a construction of an information processing apparatus according to one preferred embodiment of the present invention.

First of all, referring to the block diagram of FIG. 1, a description will be made hereinbelow of a construction of an information processing apparatus according to one preferred embodiment of the present invention. As shown in FIG. 1, the present information processing apparatus 1 includes: a Master Register File (master register; MRF) 10; a Current Window Register (current register; CWR) 20, a Current window Replace Buffer (replacing buffer; CRB) 30; an arithmetic operation unit 40; and a control unit 50.

The master register file (hereinafter called "MRF") 10 includes more than one register windows each storing data therein, and has a ring-like register file A as shown in FIG. 5. That is, a register file A, as an MRF 10, is a register file of an overlap register window type, in which register windows W0 through W7 are linked in a ring-like form with overlap between adjacent register windows.

As shown in FIG. 5, the present information processing apparatus 1 also has a CWP (Current Window Pointer; not illustrated), and one of the register windows W0 through W7 which is specified by the CWP is treated as the current register window.

The current window register (hereinafter called "CWR") 20 holds the current register window Wi (i=0, 1, . . . , 7), out of the multiple register windows W0 through W7, which is specified by the CWP, and here, the CWR holds only one register window Wi including a Global register.

To hold the current register window Wi, which is a single register window specified by the CWP, the CWR 20 is formed by a total of 32×8 byte registers: 8×8 byte registers 21 for holding Global registers; 8×8 byte registers 22 for holding Locals registers; 8×8 byte registers 23 for holding Ins registers; 8×8 byte registers 24 for holding Outs registers.

The current window replace buffer (hereinafter called "CRB") 30 is interposed between the MRF 10 and the CWR 20, and holds data of the register window Wi−1 or W+1, which is next to be held in the CWR 20 (here, when i=0, register window W7 or register window W1; when i=7, register window W6 or register window W0).

That is, the CRB 30 pre-reads and holds registers (here, some of the registers) of the register window Wi−1 or the register window Wi+1, which is next to be held in the CWR 20, under instruction of a window switching instruction (SAVE instruction or RESTORE instruction) which is executed by the arithmetic operation unit 40.

The CRB 30 is formed by a total of 16×8 byte registers: 8×8 byte registers 31 for holding Locals registers; 8×8 byte registers 32 for holding Ins or Outs registers.

In this instance, with an instruction (LOAD_CWP command) for directly rewriting the CWP value, a window switching operation can be forcibly performed. A register 31 of the CRB 30 is used in reading the Global register from the MRF 10 and making the CWR 20 hold it (to transfer the Global register to the CWR 20) at the time the contents of a register set which is necessary for execution of a new instruction string need to be updated [e.g., at the time of initial operation (that is, when the CWR 20 is empty) of the information processing apparatus 1, process switching, and thread switching].

According to the present invention, upon completion of execution of the LOAD_CWP command, data held in a single window register is transferred from the MRF to the CRB and then to the CWR. When the bus width at transfer from the MRF to the CRB and from CRB to the CWR is small, for example, if the bus width is 8 byte×8, data can be transferred by a pipeline for 8 registers in the following order named: Globals, Outs, Locals, and Ins.

Hence, with completion of execution of the LOAD_CWP instruction as a trigger, the out-of-order execution is stalled (that is, even if instruction processing subsequent to the LOAD_CWP command has already been executed by out-of-order execution before completion of execution of the LOAD_CWP command, the result of the instruction execution is abandoned, and is then executed once again after completion of execution of the LOAD_CWP command). As a result, it becomes possible that data of a single register window is copied from the MRF to the CWR with the CRB being used as a relay buffer.

The arithmetic operation unit 40, which is connected in such a manner that it is capable of reading data stored in the CWR 20 and data stored in the CRB 30, executes instructions relating to data stored in the CWR 20 and the CRB 30, a SAVE instruction for incrementing the CWP and a RESTORE instruction (RETURN instruction) for decrementing the CWP. Here, these instructions are executed in the out-of-order method (see FIG. 2 as detailed below).

The arithmetic operation unit 40 is also connected in such a manner that it is capable of writing data to the MRF 10 and the CWR 20, and performs writing operation concurrently to the MRF 10 and the CWR 20. In this instance, in the out-of-order instruction method employed by the arithmetic operation unit 40, a Commit stage (see FIG. 2 as detailed below) in which writing operation is caused is executed in the in-order method. Thus, the arithmetic operation unit 40 need not be connected so as to be able to write to the CRB 30.

The control unit 50 controls data transfer between the MRF 10 and the CWR 20 and between the CWR 20 and the CRB 30.

Now, referring to FIG. 2, a description will be made of the out-of-order instruction execution method employed by the information processing apparatus 1. Here, note that in FIG. 2 instructions in an instruction pipeline flows from the left to the right.

Figure 2:
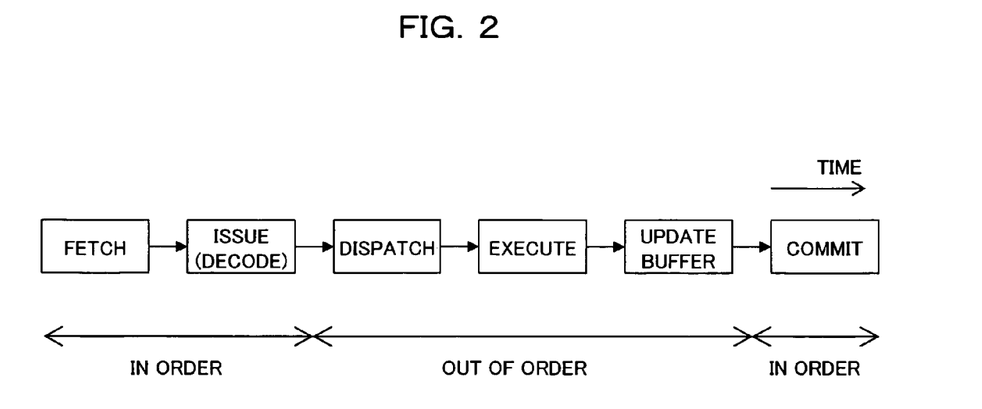
FIG. 2 is a diagram for describing an out-of-order instruction execution method employed by an arithmetic operation unit of the information processing apparatus of according to the present embodiment.

As shown in FIG. 2, in the instruction pipeline, the arithmetic operation unit 40 of the information processing apparatus 1 executes instructions in order in the instruction Fetch stage and the instruction Issue (Decode) stage. In contrast, in the instruction Dispatch stage, the Execute stage, and Update Buffer stage, the arithmetic operation unit 40 executes instructions out of order, irrespectively of the instruction execution order, and instructions are executed, beginning from the prepared one. Finally, in the Commit stage, the arithmetic operation unit 40 executes instructions in order.

Here, the Fetch stage is a stage in which instructions are read out from a memory (not illustrated); the Issue (Decode) stage is a stage in which instructions are decoded and registered in the reservation station (not illustrated); the Dispatch stage is a stage in which instructions are issued from the reservation station to instruction execution resources such as an arithmetic operation unit; the Execute stage is a stage in which instructions are executed in the instruction execution resources such as the arithmetic operation unit; the Update Buffer stage is a stage in which execution results are waited for; the Commit stage is a stage in which the results of execution of the instructions are written back (Write back) to the memory (not illustrated).

When the arithmetic operation unit 40 decodes a window switching instruction (SAVE instruction/RESTORE instruction) while it is executing instructions out of order, the control unit 50 performs control in such a manner that data (register) of the register window Wi−1 or data of the register window Wi+1, which is to be stored in the CWR 20 under the window switching instruction, is read out from the MRF 10, and is then stored in the CRB 30.

Further, after the arithmetic operation unit completes execution of such a window switching instruction, the control unit 50 replaces data (register) currently held in the CWR 20 with data (register) held in the CRB 30, thereby making the CWR 20 hold data therein of a register window which is next to be held under the window switching instruction.

Here, referring to FIG. 3 and FIG. 4(*a*) through FIG. 4(*c*), a description will be made hereinbelow of the operation of the control unit 50 and data held in the CWR 20 and the CRB 30 in a case where the register window specified by the CWP is the register window W3, and also where the arithmetic operation unit 40 executes an instruction relating to the register window W3 (hereinafter called "instruction with CWP=3"), a SAVE instruction, an instruction relating to the register window W4 (hereinafter called "instruction with CWP=4").

Figure 3:
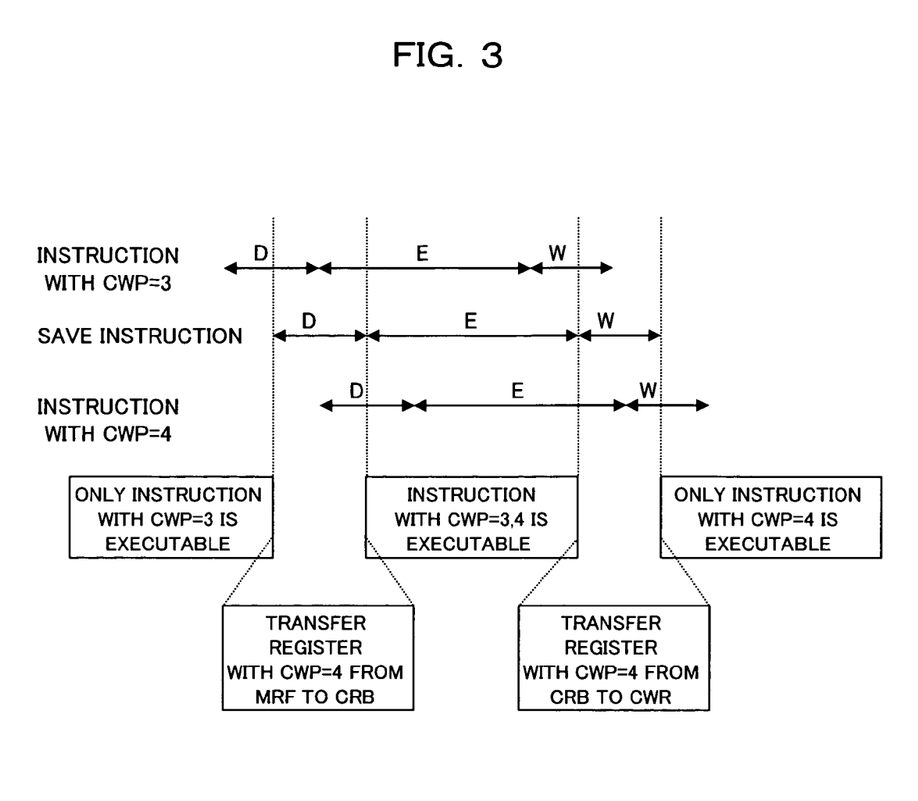
FIG. 3 is a diagram for describing an example of operation of the arithmetic operation unit of the information processing apparatus according to the present embodiment.

Here, double-headed arrows "D" in FIG. 3 designate decoding of instructions (Fetch stage+Issue stage in FIG. 2); double-headed arrows "E" designate execution (Dispatch stage+Execute stage+Update Buffer stage in FIG. 2) of instructions; double-headed arrows "W" designate completion (Write back; Commit stage of FIG. 2) of instruction. The arithmetic operation unit 40 executes instructions in order till decoding. That is, the arithmetic operation unit 40 executes the instruction with CWP=3, the SAVE instruction, and the instruction with CWP=4, in this order.

First of all, in the information processing apparatus 1, until the arithmetic operation unit 40 decodes the instruction with CWP=3, the CWR 20 holds data of the current register window (here, the register window W3; CWP=3) specified by the CWP.

Figure 4A:
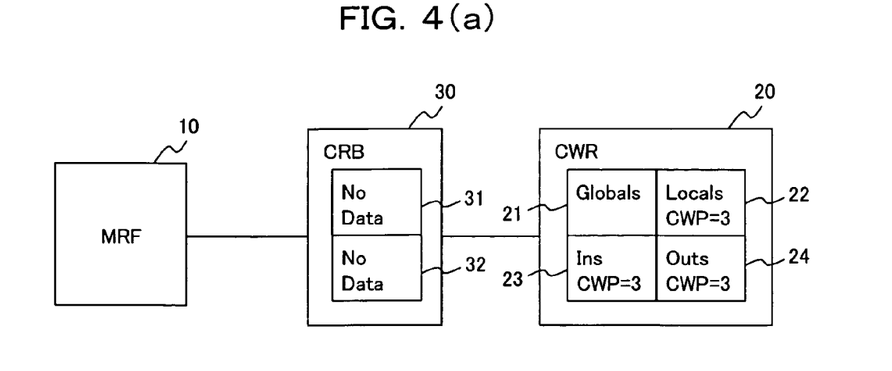
FIG. 4(a) is a view showing a state before a window switching instruction is decoded by the arithmetic operation unit.

That is, as shown in FIG. 4(*a*), before the SAVE instruction (or the RESTORE instruction) is decoded, the CWR 20 of the information processing apparatus 1 holds Globals register, which is data in the current register window W3 specified by the CWP, in the register 21; register W3Locals (described as "Locals CWP=3" in the drawing) in the register 22; register W3Ins (described as "Ins CWP=3" in the drawing), in the register 23; register W3 Outs (described as "Outs CWP=3" in the drawing), in the register 24. Under this state, the CRB 30 does not hold any data.

Thus, the arithmetic operation unit 40 is only capable of executing the instruction with CWP=3 by using the data of the register window W3 held in the CWR 20.

Subsequently, as shown in FIG. 3, when the arithmetic operation unit 40 decodes the SAVE instruction (executes the Issue stage), the control unit 50 performs control such that data held in some registers of the register window W4 (CWP=4) which is subsequently specified by the CWP under instruction of the SAVE instruction is read out and then stored in the CRB 30.

Figure 4B:
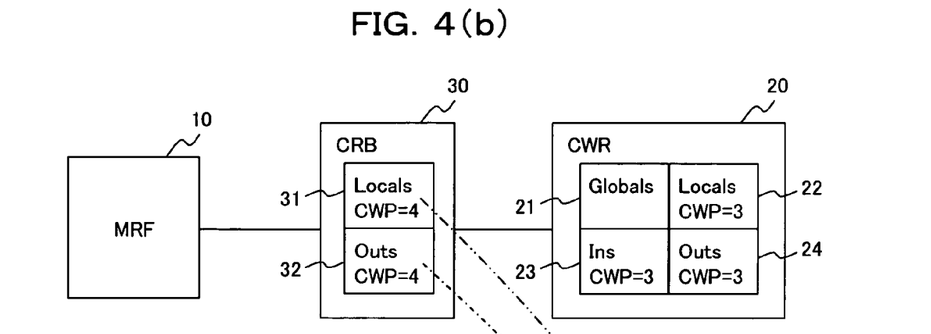
FIG. 4(b) is a view showing a state after the window switching instruction is decoded by the arithmetic operation unit.

That is, as shown in FIG. 4(*b*), when the arithmetic operation unit 40 decodes the SAVE instruction, the control unit 50 copies the contents of the register W4Locals (described as "Locals CWP=4" in the drawing) of the register window W4 (CWP=4) which is subsequently specified by the CWP under the SAVE instruction, from the MRF 10 to the register 31 of the CRB 30, and transfers the contents. Further, the control unit 50 copies the contents of the register W4 Outs (described as "Outs CWP=4" in the drawing) to the register 32 of the CRB 30 and transfers the contents.

Here, the reason why the control unit 50 does not transfer the contents of the register W4Ins of the register window W4 to the CRB 30 is that the register W4Ins overlaps with the register W3Outs of the register window W3 (overlap part) held in the register 24 of the CWR 20 (see FIG. 5).

In this manner, the control unit 50 performs control such that data (here, the register W4Locals and the register W4Outs) of a part which does not overlap with the register window W3 currently held in the CWR 20, out of data of the register window W4 which is next to be held in the CWR 20, is held in the CRB 30. The data of this non-overlap part is read out from the MRF 10 and stored in the CRB 30.

Accordingly, in the information processing apparatus 1, after decoding of the SAVE instruction by the arithmetic operation unit 40, but before the Commit stage (see FIG. 2), the contents of the register W4Locals is held in the register 31 of the CRB 30, and the contents of the register W4Outs is held in the register 32.

As a result, the arithmetic operation unit 40 is capable of executing the instruction with CWP=3 by using data of the register window W3 held in the CWR 20. Further, the arithmetic operation unit 40 is also capable of executing the instruction with CWP=4 by using a part (data of non-overlap Locals and Outs registers) of the data of the register window W4 held in the CRB 30 and the register W3outs held in the CWR 20 which overlaps with the register W4Ins.

Further, as shown in FIG. 3, after completion (Write back) of execution of the SAVE instruction by the arithmetic operation unit 40 (after execution of the Commit stage), the control unit 50 reads data from the CRB 30 and transfers the read-out data to the CWR 20 so that the CWR 20 holds data (here, the register W4Locals and the register W4Outs) stored in the CRB 30.

That is, the control unit 50 performs control such that data (here, the register W3Locals and the register W3Ins) of a part which does not overlap with the next register window W4, out of the data currently stored in CWR 20, is replaced with data (here, the register W4Locals and the register W3Ins) stored in the CRB 30, whereby the data of the next register window W4 is stored in the CWR 20.

Figure 4C:
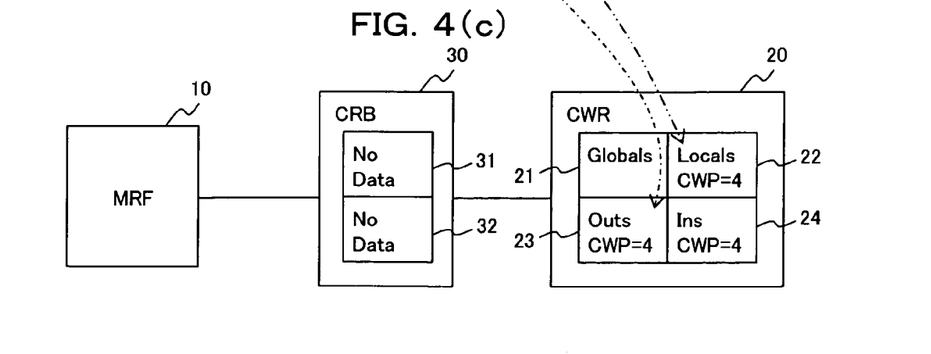
FIG. 4(c) is a view showing a state after completion of execution of the window switching instruction by the arithmetic operation unit.

More specifically, as shown in FIG. 4(*c*), after completion of execution of the SAVE instruction by the arithmetic operation unit 40, the control unit 50 replaces data (see the two-dotted arrow line P) so that the register W4Locals (described as "Locals CWP=4" in the drawing) held in the register 31 of the CRB 30 is held in the register 22 of the CWR 20. Further, the control unit 50 also replaces data (see one-dotted arrow line Q) so that the register W4Outs held in the register 32 of the CRB 30 is held in the register 23 of the CWR 20.

As to the register W4Ins which is common to when CWP=3 and when CWP=4, the register W3Outs which is originally stored in the register 24 is treated as the register W4Ins by the control unit 50.

In this manner, as to the data of apart which overlaps with the next register window W4, out of the data currently stored in the CWR 20, the control unit 50 performs control such that the data of the overlapping part is treated as the data of the next register window W4 (that is, the data is left as it is, and is used as data of the next register window), whereby the CWR 20 holds the next register window W4.

Consequently, in the CWR 20, whether Ins register or Outs registers are held in the registers 23 and 24 depends on whether the CWP takes an even number or an odd number. When the CWP changes from a even number to a odd number, the Ins register originally stored in the register 23 is treated as the Outs register of the next register window.

As a result, after completion (write back) of execution of a SAVE instruction by the arithmetic operation unit 40, the CRB 30 stores no data, and the arithmetic operation unit 40 is only capable of executing the instruction with CWP=4 by using data of the register window W4 held in the CWR 20.

In this manner, according to the information processing apparatus 1 of one preferred embodiment of the present invention, the arithmetic operation unit 40 is connected in such a manner that it can read data from the CWR 20 and the CRB 30. When the arithmetic operation unit 40 decodes a window switching instruction, the control unit 50 performs control such that data of a register window, which is next to be held in the CWR 20 after execution of the switching instruction, is read from the MRF 10 and is then stored in the CRB 30. In consequence, it becomes possible for the arithmetic operation unit 40 to read data, which is next to be held in the CWR 20 after execution of the window switching instruction, from the CRB 30 before actual execution of the window switching instruction, thereby reliably executing an instruction which uses data of the above mentioned register window.

In this instance, the CRB 30 is realized by 16 registers, and the CWR 20 is realized by 32 registers. Thus, in the present information processing apparatus 1, by means of a total of 48 registers, the arithmetic operation unit 40 is capable of executing instructions in the out-of-order instruction execution method with respect to the MRF 10 which employs register windows. Therefore, in comparison with a previous information processing apparatus 110 which is realized by 72 registers, in the present information processing apparatus 1, as many as 24 registers are reduced.

In other words, according to the present information processing apparatus 1, hardware resources are reduced, so that throughput at data reading from the CWR 20 and the CRB 30 for instruction execution by the arithmetic operation unit 40 is improved.

In addition, since the number of registers is reduced, the size of circuitry is reduced, so that an implement area and power consumption are also reduced.

Further, in the information processing apparatus 1, when the arithmetic operation unit 40 completes the execution of a window switching instruction, the control unit 50 performs control such that data of a part which does not overlap with the subsequent register window, out of data of the register window currently held by the CWR 20, is replaced with data held in the CRB 30, whereby data of the next register window is stored in the CWR 20. Thus, writing processing to the CWR 20 relating to execution of instructions which are performed in order is reliably performed. That is, writing processing relating to execution of instructions is reliably performed without the necessity of connecting the arithmetic operation unit 40 in such a manner that writing processing can be performed to the CRB 30.

Furthermore, in the information processing apparatus 1, after completion of execution of a switching instruction by the arithmetic operation unit 40, the control unit 50 treats data of a part which overlaps with the next register window, out of the data currently stored in the CWR 20, as data of the next register window, whereby the next register window is held in the CWR 20. Thus, in order to eventually store a register window, including three areas (Local registers, Ins registers, and Outs registers), in the CWR 20, the CRB 30, which functions as a relay point, need to have only two areas, so that the amount of hardware resource is reduced. More specifically, only 16 registers are needed to realize the CRB 30, not 24 registers which are necessary to retain the whole register window.

[2] Other Modification(s)

The present invention should by no means be limited to the above-illustrated embodiment, and various changes or modifications may be suggested without departing from the gist of the invention.

For example, the number of register windows stored in the register file A and the capacity (the number of registers) of each register window should by no means be limited to those in the above-described example, and they can be changed.

Further, the object of processing performed by the information processing apparatus of the present invention should by no means be limited to register files of an overlap window type, and the present invention is applicable to any register file as long as it includes more than one register window.

Accordingly, in the present invention, the capacities of the CWR 20 and the CRB 30 are varied according to the register windows held by the MRF 10.

As detailed so far, the information processing apparatus of the present invention comprises:

a master register formed by a plurality of register windows storing data therein;

a current register which holds a current register window, out of said plurality of register windows of the master register;

a replacing buffer interposed between the master register and the current register, the replacing buffer holding data of a register window which is to be subsequently held in the current register;

an arithmetic operation unit which is connected so as to be able to read data held in the current register and the replacing buffer, the arithmetic operation unit executing an instruction relating to data held in the current register and the replacing buffer;

a control unit which executes, if a window switching instruction, which is for switching the present register window held in the current register into another register window, is decoded at execution thereof by said arithmetic operation means, control in such a manner that data which is next to be stored in the current register under the switching instruction is read from the master register and is then stored in the replacing buffer.

In this instance, it is preferable that, after completion of execution of the switching instruction by the arithmetic operation unit, the control unit replace data currently held in the current register with data held in the replacing buffer, thereby storing data held in the next register window in the current register under the switching instruction.

Further, it is also preferable that the arithmetic operation unit perform writing operations to the master register and to the current register. At this time, the arithmetic operation unit preferably performs the above writing operations concurrently.

Still further, the above mentioned master register is preferably a register file of an overlap window type. In this instance, it is preferable that the control unit execute control such that the replacing buffer hold data which does not overlap with the present register window currently held in the current register, out of data of the register window which is next to be held in the current register.

It is also preferable that, if the switching instruction is decoded by the arithmetic operation unit, the control unit read data which does not overlap with the present register window held in the current register, out of the register window which is next to be held, and then makes the thus read-out data to be held in the replacing buffer. In this instance, after completion of execution of the switching instruction, the control unit preferably replaces data which does not overlap with the next register window, out of data currently held in the current register, with data held in the replacing buffer, whereby data of the next register window is held in the current register.

Further, after completion of execution of the switching instruction by the arithmetic operation unit, the control unit preferably reads data which overlaps with the next register window, out of data currently held in the current register, as data of the next register window, whereby the control unit makes the data of the next register window to be held in the current register.

Furthermore, it is preferable that the master register has a current pointer which indicates a current register window held in the current register. In this instance, it is also preferable that the above switching instruction, which is to be executed by the arithmetic operation, is a save instruction for incrementing the current pointer, and at the same time, is a restore instruction for decrement the current pointer.

What is claimed is:

1. An arithmetic processor, comprising:
   at least one register file having a plurality of register windows each formed by a set of registers including an in-register, a local register, and an out-register, said plurality of register windows being arranged in a ring-like form;
   a current window pointer which indicates the position of a current register window by using a pointer value when access is performed to the register windows;
   a current register which reads data, stored in a register window that is specified by the pointer value indicated by said current window pointer, from a respective register file;
   a replacing buffer configured between said respective register file and said current register, said replacing buffer holding data which is to be sent from said respective register file to said current register;
   an arithmetic operation unit which decodes a window switching instruction for switching the register windows and an instruction relating to data stored in said current register or data held in said replacing buffer, the arithmetic operation unit then executing the instructions; and
   a control unit which transfers, if a window switching instruction is decoded by said arithmetic operation unit, data of the register window which is to be specified by said current window pointer upon completion of execution of the window switching instruction, to said replacing buffer.

2. An arithmetic processor as set forth in claim 1, wherein, after completion of execution of the window switching instruction by said arithmetic operation unit, said control unit replaces data store in said current register with data held in said replacing buffer, thereby storing data in the next resister window, into which the current register window is switched under the window switching instruction, in said current register.

3. An arithmetic processor as set forth in claim 1, wherein said arithmetic operation unit writes result data, obtained after execution of the instruction, to said respective register file and said current register.

4. An arithmetic processor as set forth in claim 1, wherein said arithmetic operation unit concurrently writes result data, obtained after execution of the instruction, to both said respective register file and said current register.

5. An arithmetic processor as set forth in claim 1, wherein, in said respective register file, the in-register of one of two adjacent register windows and the out-register of the other of the two adjacent register windows are provided as one common register.

6. An arithmetic processor as set forth in claim 5, wherein, if said arithmetic operation unit decodes the window switching instruction, said control unit transfers, to said replacing buffer, data stored in the local register of the register window which is specified by the pointer value and data stored in either the in-register or the out-register of the register window which is specified by the pointer value.

7. An arithmetic processor as set forth in claim 5, wherein, if said arithmetic operation unit completes execution of the window switching instruction, said control unit transfers, from said replacing buffer to said current register, data stored in the local register of the register window which is specified by the pointer value and data stored in either the in-register or the out-register of the register window which is specified by the pointer value.

8. An arithmetic processor, comprising:
   a register file which has multiple register windows each including plural windows, said plural windows being arranged in a ring-like form;
   a current window pointer which indicates the position of a current window by using a pointer value when access is performed to the register windows;
   a current register which reads data, stored in the current window that is specified by the pointer value indicated by said current window pointer, from said register file;
   a replacing buffer configured between said register file and said current register, said replacing buffer holding data of said window which is to be sent from said register file to said current register;
   an arithmetic operation unit which decodes a window switching instruction for switching the windows and an instruction relating to data stored in said current register or data held in said replacing buffer, the arithmetic operation unit then executing the instructions; and
   a control unit transferring, upon decoding of the window switching instruction by the arithmetic operation unit, data of a next register window from said register file to said current register via said replacing buffer.

9. An arithmetic processor as set forth in claim 8,
   wherein a window of said register file is formed by a set of registers: an in-register; a local register; and an out-register, and a set of global registers which is shared among said register windows, and
   wherein data of said one register window, which data is to be transferred from said register file to said replacing buffer or from said replacing buffer to said current register, is transferred in the following order named: data relating to the global register, data relating to the out-register, data relating to the in-register, and data relating to the local register.

10. An information processing apparatus, comprising:
    at least one register file having a plurality of register windows each formed by a set of registers including an in-register, a local register, and an out-register, said plurality of register windows being arranged in a ring-like form;
    a current window pointer which indicates the position of a current register window by using a pointer value when access is performed to the register windows;
    a current register which reads data, stored in a register window that is specified by the pointer value indicated by said current window pointer, from a respective register file;
    a replacing buffer configured between said respective register file and said current register, said replacing buffer holding data which is to be sent from said respective register file to said current register;
    an arithmetic operation unit which decodes a window switching instruction for switching the register windows and an instruction relating to data stored in said current register or data held in said replacing buffer, the arithmetic operation unit then executing the instructions; and a control unit which transfers, if a window switching instruction is decoded by said arithmetic operation unit, data in a register window which is to be specified by said current window pointer upon completion of execution of the window switching instruction, to said replacing buffer.

11. An information processing apparatus as set forth in claim 10, wherein, after completion of execution of the window switching instruction by said arithmetic operation unit, said control unit replaces data stored in said current register with data held in said replacing buffer, thereby storing data in the next resister window, into which the current register window is switched under the window switching instruction, in said current register.

12. An information processing apparatus as set forth in claim 10, wherein said arithmetic operation unit writes result data, obtained after execution of the instruction, to said respective register file and said current register.

13. An information processing apparatus as set forth in claim 10, wherein said arithmetic operation unit concurrently writes result data, obtained after execution of the instruction, to both said respective register file and said current register.

14. An information processing apparatus as set forth in claim 10, wherein, in said respective register file, the in-register of one of two adjacent register windows and the out-register of the other of the two adjacent register windows are provided as one common register.

15. An information processing apparatus as set forth in claim 14, wherein, if said arithmetic operation unit decodes the window switching instruction, said control unit transfers, to said replacing buffer, data stored in the local register of the register window which is specified by the pointer value and data stored in either one of the in-register or the out-register of the register window which is specified by the pointer value.

16. An information processing apparatus as set forth in claim 14, wherein, if said arithmetic operation unit completes execution of the window switching instruction, said control unit transfers, from said replacing buffer to said current register, data stored in the local register of the register window which is specified by the pointer value and data stored in either the in-register or the out-register of the register window which is specified by the pointer value.

17. An information processing apparatus, comprising:
a register file which has multiple register windows each including plural windows, said plural windows being arranged in a ring-like form;
a current window pointer which indicates the position of a current window by using a pointer value when access is performed to the register windows;
a current register which reads data, stored in the current window that is specified by the pointer value indicated by said current window pointer, from said register file;
a replacing buffer configured between said register file and said current register, said replacing buffer holding data of said window which is to be sent from said register file to said current register;

an arithmetic operation unit which decodes a window switching instruction for switching the windows and an instruction relating to data stored in said current register or data held in said replacing buffer, the arithmetic operation unit then executing the instructions; and a control unit transferring, upon decoding of the window switching instruction by the arithmetic operation unit, data of a next register window from said register file to said current register via said replacing buffer.

18. An information processing apparatus as set forth in claim 17,
wherein a window of said register file is formed by a set of registers: an in-register; a local register; and an out-register, and a set of global registers which are shared among said register windows, and
wherein data of said one register window, which data is to be transferred from said register file to said replacing buffer or from said replacing buffer to said current register, is transferred in the following order named: data relating to the global register, data relating to the out-register, data relating to the in-register, and data relating to the local register.

19. A register file control method for an arithmetic processor including: a register file having a plurality of register windows arranged in a ring-like form, each said register window being formed by a set of registers; a current window pointer which indicates the position of a current register window by using a pointer value; a current register which reads data, stored in a register window that is specified by the pointer value indicated by said current window pointer, from said register file; and a replacing buffer for holding data which is to be sent from said register file to said current register, said method comprising:
decoding a window switching instruction for switching the register windows and an instruction relating to data stored in said current register or data held in said replacing buffers, then executing the window switching instructions, and
transferring, if a window switching instruction is decoded by said arithmetic operation unit, data in a register window which is to be specified by said current window pointer upon completion of execution of the window switching instruction, to said replacing buffer.

20. A register file control method as set forth in claim 19, further comprising:
replacing, after completion of execution of the window switching instruction by said arithmetic operation unit, data store in said current register with data held in said replacing buffer, thereby storing data in the next resister window, into which the current register window is switched under the window switching instruction, in said current register.

* * * * *

UNITED STATES PATENT AND TRADEMARK OFFICE
CERTIFICATE OF CORRECTION

PATENT NO. : 7,343,478 B2  
APPLICATION NO. : 11/333229  
DATED : March 11, 2008  
INVENTOR(S) : Ryuji Kan et al.

It is certified that error appears in the above-identified patent and that said Letters Patent is hereby corrected as shown below:

\*    Col. 15, line 47, delete "resister" and insert --register--, therefor.

\*    Col. 17, line 15, delete "resister" and insert --register--, therefor.

Col. 18, line 39, delete "buffers" and insert --buffer--, therefor.

Col. 18, line 40, delete "instructions" and insert --instruction--, therefor.

\*    Col. 18, line 51, delete "resister" and insert --register--, therefor.

Signed and Sealed this

Twenty-ninth Day of July, 2008

JON W. DUDAS  
*Director of the United States Patent and Trademark Office*